US012574211B2

(12) United States Patent
Goodman et al.

(10) Patent No.: US 12,574,211 B2
(45) Date of Patent: Mar. 10, 2026

(54) PERSONAL PRIVATE KEY ENCRYPTION DEVICE

(71) Applicant: Dell Products L.P., Round Rock, TX (US)

(72) Inventors: Bradley K. Goodman, Nashua, NH (US); Joseph B. Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 424 days.

(21) Appl. No.: 17/725,337

(22) Filed: Apr. 20, 2022

(65) Prior Publication Data

US 2023/0344620 A1      Oct. 26, 2023

(51) Int. Cl.
*H04L 9/08*          (2006.01)

(52) U.S. Cl.
CPC ..................................... *H04L 9/08* (2013.01)

(58) Field of Classification Search
CPC ....... H04L 9/08; H04L 9/0816; H04L 9/0819; H04L 9/0822; H04L 9/0825
See application file for complete search history.

(56) References Cited

U.S. PATENT DOCUMENTS

| | | | | | |
|---|---|---|---|---|---|
| 6,453,416 | B1 * | 9/2002 | Epstein | ................... | G06F 21/64 |
| | | | | | 713/170 |
| 8,245,307 | B1 * | 8/2012 | Pharris | .................. | H04L 9/3234 |
| | | | | | 713/176 |

| | | | | | |
|---|---|---|---|---|---|
| 2002/0069369 | A1 * | 6/2002 | Tremain | .................. | H04L 67/01 |
| | | | | | 709/224 |
| 2006/0133604 | A1 * | 6/2006 | Buer | .................... | H04L 63/0428 |
| | | | | | 380/28 |
| 2007/0150948 | A1 * | 6/2007 | De Spiegeleer | ........ | G06F 21/57 |
| | | | | | 726/22 |
| 2008/0198177 | A1 * | 8/2008 | Niemi | ................... | G06T 3/4092 |
| | | | | | 345/660 |
| 2013/0007316 | A1 * | 1/2013 | Moon | .................. | G05B 19/042 |
| | | | | | 710/62 |
| 2013/0159021 | A1 * | 6/2013 | Felsher | .................. | G16H 10/60 |
| | | | | | 705/3 |
| 2015/0066984 | A1 * | 3/2015 | Chung | ..................... | H04L 9/40 |
| | | | | | 707/770 |
| 2018/0294980 | A1 * | 10/2018 | Baentsch | .............. | G06F 21/445 |
| 2020/0310823 | A1 * | 10/2020 | Poosapalli | ........... | G06F 9/4406 |
| 2021/0248124 | A1 * | 8/2021 | Tobin | .................. | G06F 12/0882 |
| 2022/0345483 | A1 * | 10/2022 | Shua | ..................... | H04L 9/0825 |

FOREIGN PATENT DOCUMENTS

EP          3945442 A1 *    2/2022    ........... H04L 9/3234

* cited by examiner

*Primary Examiner* — Amie C. Lin
*Assistant Examiner* — Ayub A Maye
(74) *Attorney, Agent, or Firm* — WOMBLE BOND DICKINSON (US) LLP

(57) ABSTRACT

Methods and systems for managing the security of private keys in a distributed system are disclosed. The distributed system may include insecure data processing systems that utilize signatures generated using private keys. The private keys may be subject to undesired dissemination if obtained by the insecure data processing systems. To improve the security of the private keys, a security device may be utilized. The security device may facilitate review and signing of data structures to obtain signatures without disclosure of private keys to insecure data processing systems.

20 Claims, 10 Drawing Sheets

PERSONAL PRIVATE KEY ENCRYPTION DEVICE

FIELD OF THE DISCLOSED EMBODIMENTS

Embodiments disclosed herein relate generally to key management. More particularly, embodiments disclosed herein relate to systems and methods for key management in distributed systems.

BACKGROUND

Computing devices may store data and used stored data. For example, computing devices may utilize data when providing computer implemented services. Different computing devices may perform similar and/or different functions. To operate as a distributed system, all or a portions of the computing devices may need to be able to verify communications from the other computing devices.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
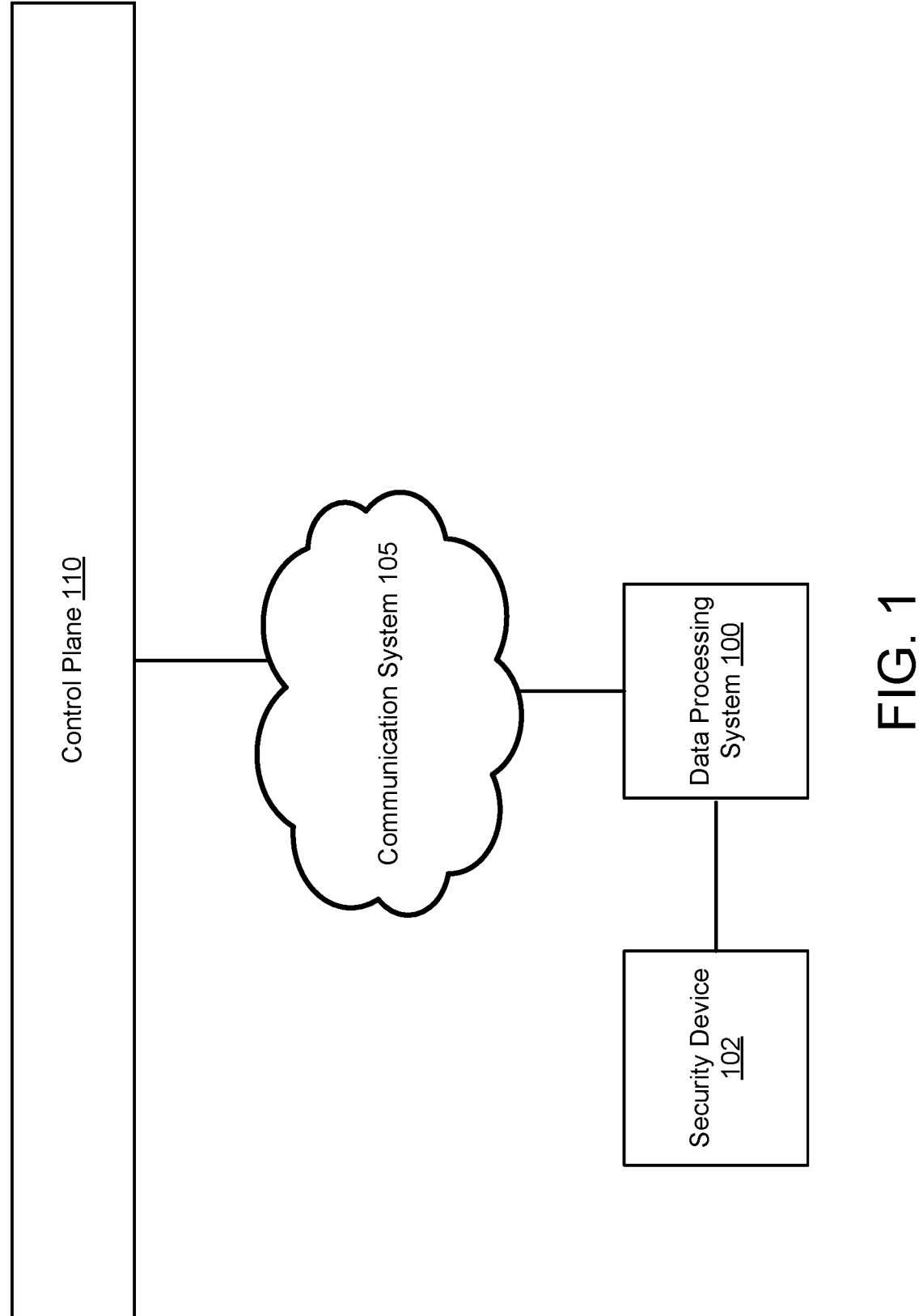
FIG. 1 shows a block diagram illustrating a system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing the security of private keys in a distributed system. The distributed system may include insecure data processing systems that utilize signatures generated using private keys. The private keys may be subject to undesired dissemination if obtained by the insecure data processing systems.

To improve the security of private keys, a security device may be utilized. The security device may be hardened devices that may operably connect to insecure data processing systems. Data structures for signing consideration by a user may be obtained by the security device. The security device may present information regarding the obtained data structures to a user via a display of the security device. The information may allow the user to decide whether signatures for any of the data structures should be generated.

The security device may include one or more interface elements that allow the security device to directly obtain input from the user. The input may indicate whether signing authorization for any of the data structures is granted.

The security device may also include one or more user interface elements for obtaining security information such as passcodes or biometric information required for signing authority to be granted.

When a data structure is authorized for signing, the security device may generate a signature for the data structure using a copy of a private key associated with the user locally stored in the security device. The private key may not be accessible.

When signatures are generated, they may be provided to other devices such as operably connected insecure data processing systems for use and/or distribution.

By doing so, embodiments disclosed herein may facilitate secure generation of signatures with reduced risk of undesired private key dissemination. By doing so, insecure data processing systems may be used in a distributed system with reduced risk of private keys being compromised.

In an embodiment, a computer-implemented method for managing security in a distributed system comprising an insecure data processing system is provided. The method may include obtaining, by a security device and from the insecure data processing system, a data structure for signing; presenting information regarding the data structure to a user of the insecure data processing system via a display of the security device; obtaining user input from the user, the user input being responsive to the presented information, and the user input being obtained with an interface element of the security device; making a determination that the user input indicates signing approval from the user for the data structure; based on the determination: generating a signature using the data structure and a private key associated with the user; and providing the data structure to the insecure data processing system. An insecure data processing system may be a computing device having software and/or hardware components whose security status has not be identified.

Obtaining the data structure may include emulating a storage device; presenting the emulated storage device to the insecure data processing system; and receiving the data structure via a storage command from the insecure data processing system, the storage command being directed to the emulated mass storage device.

Providing the data structure to the insecure data processing system may include presenting the signature to the insecure data processing system as a data structure stored on the emulated mass storage device; receiving a read command for the signature from the insecure data processing system and directed toward the emulated mass storage device; generating a read response based on the signature; and sending the read response to the insecure data processing system.

Presenting the signature to the insecure data processing system may include participating in a flush of the emulated mass storage device by the insecure data processing system.

The computer-implemented method may also include enrolling the security device with the insecure data processing system prior to obtaining the data structure.

The private key may be inaccessible to the insecure data processing system from the security device.

Presenting information regarding the data structure to the user of the insecure data processing system via the display of the security device may include generating a reduced size representation of the data structure; and displaying a portion of the reduced size representation of the data structure on the display of the security device.

The reduced size representation may include a hash of the data structure.

Presenting information regarding the data structure to the user of the insecure data processing system via the display of the security device further may include coordinating with a second insecure data processing system operably connected to the insecure data processing system to generate a copy of the reduced size representation of the data structure to facilitate comparison of the reduced size representation and the copy of the reduced size representation by the user.

Coordinating with the second insecure data processing system may include identifying a portion of the data structure corresponding to a hash type identifier; and generating the hash based on the hash type identifier. For example, a hash type identifier (e.g., how a hash is to be generated, the hash size, etc.) may be included in the data structure.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include, but is not limited to data processing system 100.

Data processing system 100 may provide the computer implemented services (in isolation or cooperation with other data processing system not illustrated in FIG. 1). For example, data processing system 100 may independently and/or cooperatively (e.g., with other devices) provide any number and type of computer implemented services.

For example, data processing systems 100 may provide computer implemented services to users and/or other computing devices operably connected to data processing system 100. The computer implemented services may include any type and quantity of services including, for example, database services, instant messaging services, video conferencing services, etc. Different systems may provide similar and/or different computer implemented services.

Due to the distributed nature of the system illustrated in FIG. 1, the components of FIG. 1 may implement processes for (i) command and control (e.g., determining whether to follow a request, action, instruction, etc.), (ii) verify whether communications are authentic, and/or (iii) perform other types of processes to manage coordination within the environment. To do so, the components of FIG. 1 may utilize key (e.g., public/private) to sign various data structures. Signing a data structure using a key may allow other entities to verify the identity of the entity that caused the data structure to be signed (e.g., signed with a private key and verifiable using a public key). Consequently, various entities in a distributed system may be able to communicate information to one another in a verifiable manner. The communicated information may be used, for example, for command and control purposes or for other reasons.

To facilitate command and control, the system of FIG. 1 may include control plane 110. Control plane 110 may manage the operation of various devices, such as data processing system 100 and/or other devices not illustrated in FIG. 1. For example, control plane 110 may limit or authorize actions of data processing system 100. Control plane 110 may do so on the basis of permissions or other access/operational controls tied to users (e.g., people). For example, for a given user, control plane 110 may enable and/or prevent various actions of data processing system 100 to be performed. Thus, control plane 110 may identify which user is attempting to initiate a particular action and enable/prevent the action from being initiated on the basis of the identity of the user.

To identify which user is attempting to initiate a particular action (or, more broadly speaking, whether a user has attested to a data structure), a signature may be utilized. The signature may include information usable to ascertain whether the information in the signature was generated using a private key associated with the user. For example, a public key associated with the identity of a user may be used to ascertain whether the signature was generated using a private key associated with the user. If the signature is verified as being generated using the private key of the user, then the system of FIG. 1 may treat the information included in the signature as being verified as being from the user (e.g., a signature may include an ingest data structure and an encrypted version of the data structure encrypted using the user's private key, the user's public key may be used to decrypt the encrypted version to obtain a second copy of the ingest data structure, and a match between the data structure and the obtained copy of the data structure may indicate that the user associated with the public/private keys authorized signing of the data structure to indicate that user agrees with the information in the ingest data structure).

However, the command and control approach via signature implemented by data processing system 100 and control plane 110 may be predicated on secrecy of the private key of a user. If other entities are able to utilize the private key of the user, the signature based approach to command and control may be breached thereby resulting in undesired action being performed through use of signatures by the other entities. For example, the other entities may generate and use signatures to indicate that the user associated with the private key has requested that certain actions be performed (and, more broadly, that certain data structures, which may be used for other purposes, are from the user) while the user has made no such requests.

For example, consider a scenario where a user is using data processing system 100. Data processing system 100 may be implemented with a large number of hardware and/or software components. Any of these components may be compromised by a third party. If the user's private key is communicated to data processing system 100, then the user's private key may also be compromised through actions of the compromised hardware and/or software components.

In general, embodiments disclosed herein relate to systems, methods, and devices for managing operation of a distributed system (e.g., like the system shown in FIG. 1) through use of signatures. To manage the distributed system, the system of FIG. 1 may include security device 102.

Security device 102 may facilitate generation and distribution of signatures while maintaining the privacy of a private key used to generate the signatures. To do so, security device 102 may (i) obtain copies of data structures for signing consideration by a user, (ii) present information regarding the data structures to the user, (iii) obtain input regarding the data structures directly from the user, (iv) sign or reject the data structures using the user's private key depending on the corresponding input obtained directly from the user, and (v) distribute the signed data structures. While performing these functions, security device 102 may maintain secrecy of the user's private key. For example, security device 102 may not expose the user's private key to data processing system 100, or other entities.

To obtain data structures for signing consideration and distribute signed data structures, security device 102 may operably connect to data processing system 100. When operably connected to data processing system 100, security device 102 may implement processes for limiting communications to only those required for obtaining the data structures and providing signed data structures. For example, security device 102 may present itself as a mass storage device (e.g., through emulation) or other type of device with a limited number of functions available to data processing system 100. These functions may include, for example, storing data structures in the mass storage device and reading data structures from the mass storage device. Security device 102 may be hardened to ignore communications from data processing system 100 directed to other types of functions.

Figure 2A:
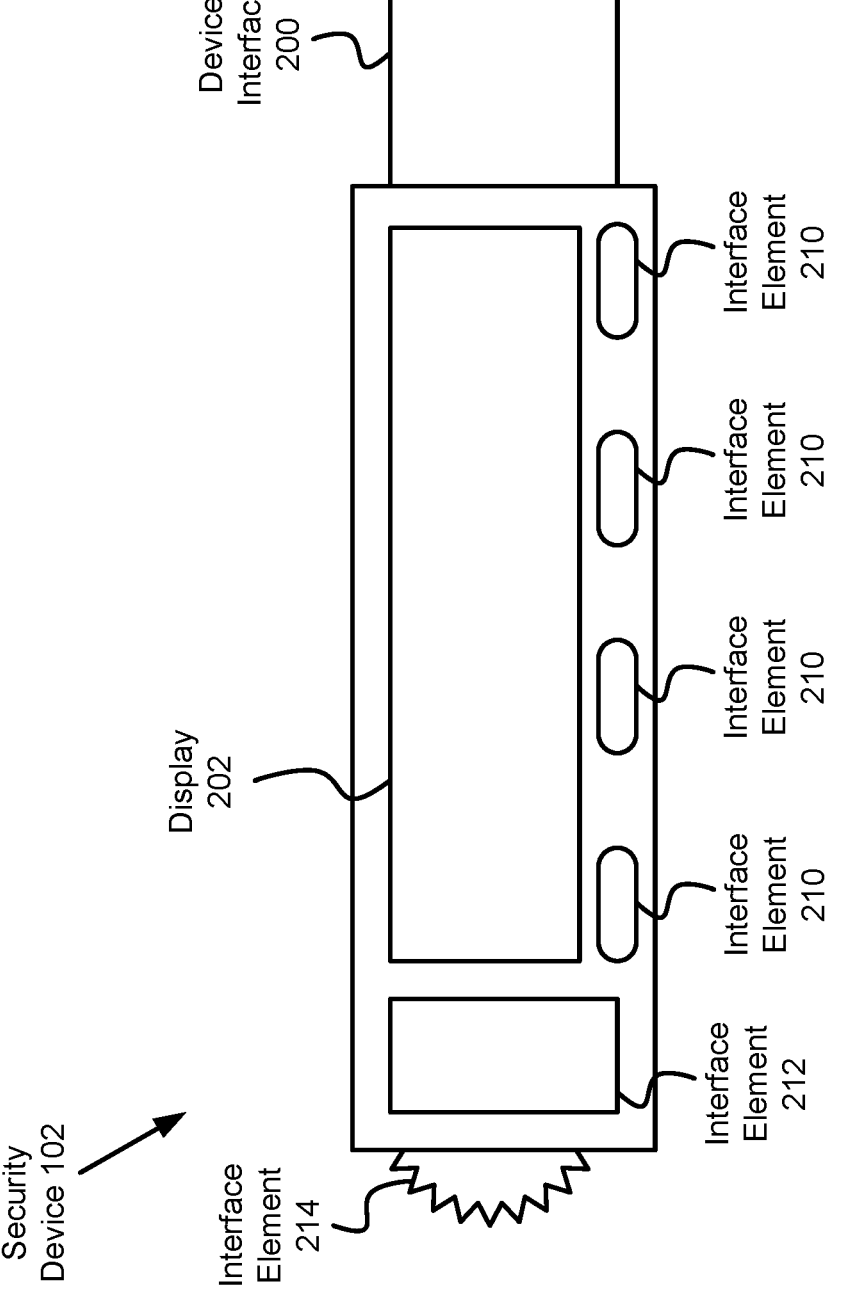
FIG. 2A shows a diagram illustrating a security device in accordance with an embodiment.
Figure 2B:
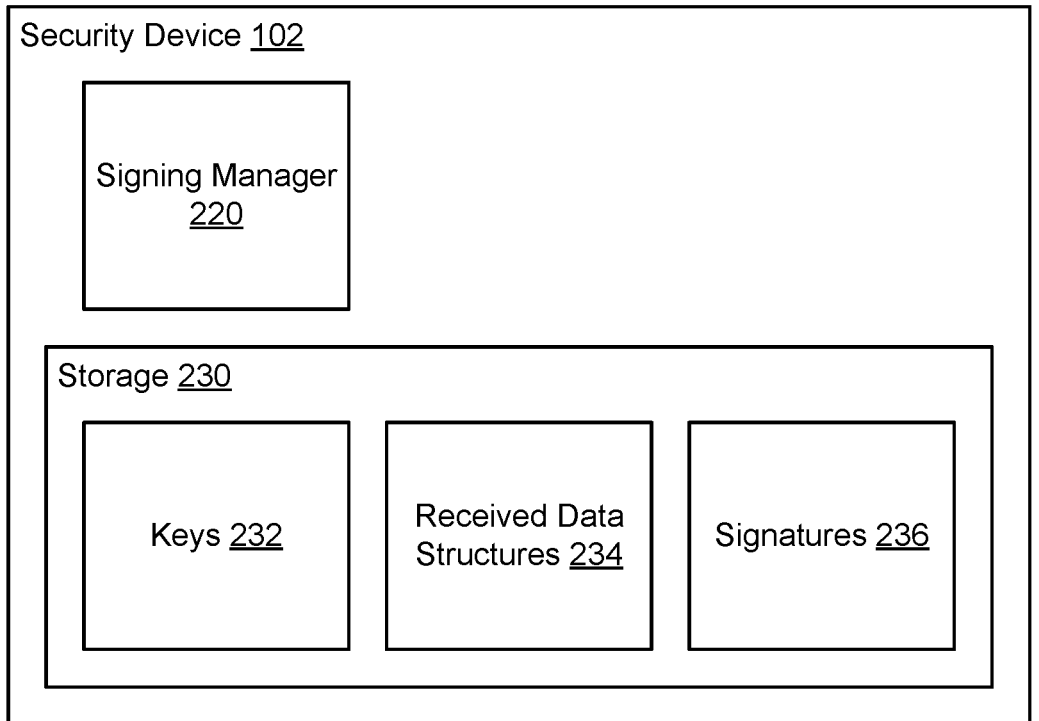
FIG. 2B shows a block diagram illustrating a security device in accordance with an embodiment.

By doing so, security device 102 may generate signatures on behalf of a user in a manner that does not expose the user's private key to potentially compromised hardware and/or software components. Refer to FIGS. 2A-2B for additional details regarding security device 102.

Any of security device 102, data processing system 100, and security device 102 may be implemented using a data processing system (e.g., a computing device) such as a host or server, a personal computer (e.g., desktops, laptops, and tablets), a "thin" client, a personal digital assistant (PDA), a Web enabled appliance, a system on a chip, an embedded computing device, a mobile phone (e.g., Smartphone), or any other type of data processing device or system. For additional details regarding data processing systems, refer to FIG. 5.

Any of data processing system 100 and control plane 110 may be implemented with multiple computing devices. The computing device may form a distributed system operably connected via one or more networks. The computing devices may manage their operation using a command and control scheme which may utilize signatures.

The functionality of control plane 110 may be performed, in part, as a shared service (e.g., distributed application). For example, the shared service may include agents hosted by various computing devices (not shown).

Figure 3:
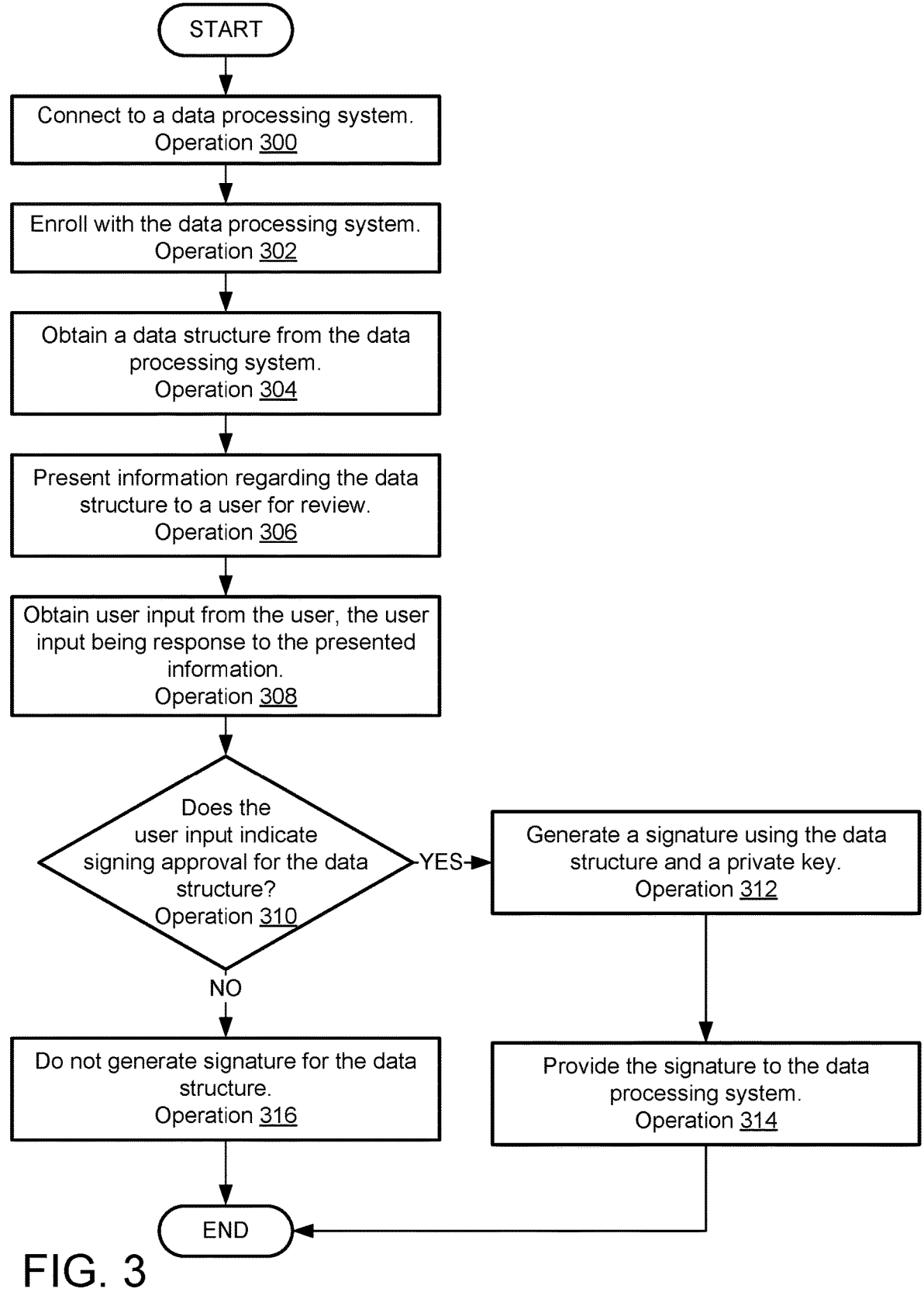
FIG. 3 shows a flow diagram illustrating a method of managing signature generation and distribution in accordance with an embodiment.

Security device 102, data processing system 100, and/or control plane 110 may perform all, or a portion, of the methods illustrated in FIG. 3.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

As discussed above, the system of FIG. 1 may facilitate review and signing of data structures without exposing a user's private key through use of a security device. Turning to FIG. 2A, a diagram of security device 102 in accordance with an embodiment is shown.

Security device 102 may be implemented using a hardware device. The hardware device may include functionality (i) to communicate with data processing systems to obtain data structures and provide signed data structures, (ii) present information regarding obtained data structures to a user of security device 102, the information usable by the user to evaluate whether to authorize signing of any data structure, (iii) obtain user feedback regarding whether a data structures is to be signed, (iv) prevent use of security device 102 by persons other than the user (e.g., for which a copy of the user's private key is stored in security device 102), (v) sign data structures on behalf of the user and based on the user feedback without exposing the user's private key to users of security device 102 or other devices, and/or (vi) distribute signed data structures.

To provide the above noted functionality, security device 102 may include one or more of device interface 200, display 202, interface element 210, interface element 212, and interface element 214. Each of these components of security device 102 is discussed below.

Device interface 200 may include a physical device that allows security device 102 to operably connect to other devices. For example, device interface 200 may include one or more of (i) a serial interface device (e.g., a plug an chipset), (ii) a universal serial bus interface device (a plug and chipset), (iii) a wireless communication device such as a bluetooth chipset, a wireless local area network chipset, or a near field communications chipset, (iv) optical communication devices such as a camera that may receive information from a display of another device (e.g., which may display text or a graphical code which may be imaged by the camera), and/or (v) other types of communication devices. In any of the above examples, the operable connection established via these devices may be a direct operable connection with another device rather than an indirect operable through a network or other intermediary.

In an embodiment, device interface 200 presents security device 102 as a mass storage device to other devices. For example, device interface 200 may present security device 102 as a plug and play compatible mass storage device. Consequently, a broad range of data processing systems (e.g., compatible with mass storage devices and/or plug and play devices) may be able to natively connect and communicate with security device 102. Accordingly, data processing systems may not need to host any specialized hardware and/or software components for cooperative operation with security device 102.

By presenting itself as a mass storage device, an operably connected data processing system may interact with it by storing data (e.g., for signing consideration) in it and reading data (e.g., signatures) from it. In an embodiment, security device 102 emulates the operation of a universal serial bus thumb drive. Accordingly, a data processing system to which security device 102 operably connects may treat security device 102 as a storage device and use its pre-existing functionality for interacting with storage devices to interact with security device 102.

Display 202 may include a physical display such as an alphanumeric display, pixel based display, or other type of display that may be used to present information to a user in the vicinity of security device 102. Display 202 may be used, for example, to display portions of obtained data structures, other data structures (e.g., reduced size data structures such as hashes of all or a portion of data structure) generated based on the obtained data structures, and/or other types of information. A user may use the presented information to decide whether a data structure should be signed.

For example, the user may be concerned that a compromised portion of an operably connected data processing system may modify or otherwise inject data in to a data structure obtained from it by security device 102. To verify the integrity of the data structure, the user may review portions of the data structures as interpreted by security device 102 rather than as interpreted by the data processing system which may be subject to compromise. Reduced size data structure derived from obtained data structures may also or alternatively be presented to the user via security device 102. If the user has a trusted source that may also obtain similar reduced size data structures based on the data structure, then the user may make compare the two reduced size data structures to verify that the data structure obtained from the data processing system has not been compromised.

For example, consider a scenario where another data processing system that is trusted by the user sends a data structure to the data processing system to which security device 102 is operably connected. If the data processing system is compromised, then the data processing system may compromise the data structure through modification prior to providing the data structure to security device 102. To determine whether the data structure has been compromised, security device 102 may obtain a hash based on the data structure and display it to the user via display 202. The other data processing system may obtain a similar hash for the data structure and present the hash to the user (e.g., through the data processing system such as via a webpage, through another communication system such as a message sent via a radio access network to a smart phone associated with the user, etc.). The user may then determine if the copy of the data structure in security device 102 has been compromised based on the comparison (e.g., if the hashes match, then not compromised).

Interface element 210 may include a physical device such as a user operable button for obtaining feedback from the user. Security device 102 may include any number of interface element 210.

Interface element 212 may include a physical device for obtaining information usable to verify that the user of security device 102 is interacting with security device 102. Interface element 212 may include, for example, one or more biometric sensors such as a finger print scanner, a camera, and/or other types of sensors that may be adapted to identify biometric markers of a user of security device 102. The biometric markers may be used to determine whether a person using security device 102 is the user associated with the private key stored in security device 102.

Interface element 214 may include a physical device such as a rotary wheel for obtaining feedback from the user. Security device 102 may include any number of interface element 214.

The user input obtained via interface elements 210-214 may be used to, for example, guide the display of information on display 202, indicate assent or dissent with respect to signing of various data structures, and/or for other purposes. Any quantity and type of user input may be obtained via interface elements 210-214. While described with specific types of interface elements, a security device may include other types of interface elements (e.g., touch sensitive displays, full keypads, etc.) without departing embodiments disclosed herein.

While illustrated in FIG. 2A with a limited number of specific components, a security device may include additional, fewer, and/or different components without departing from embodiments disclosed herein.

Turning to FIG. 2B, a block diagram of security device 102 in accordance with an embodiment is shown. To provide its functionality, security device 102 may include signing manager 220 and storage 230. Each of these components is discussed below.

Signing manager 220 may manage the operation of security device 102 to facilitate review and signing of data structures. To do so, signing manager 220 may (i) emulate the operation of mass storage devices and/or universal serial bus compatible external devices, (ii) maintain the privacy of a private key associated with a user in storage 230 and/or use public keys associated with the user in storage 230 to enroll security device 102, (iii) manage the storage of received data structures 234 from other devices through the emulated behavior of a mass storage device, (iv) manage the operation of the display of security device 102, and/or (v) manager the generation and/or distribution of signatures 236 based on instructions obtained via interface elements of security device 102.

When providing its functionality, signing manager 220 may perform all or a portion of the methods illustrated in FIG. 3.

In an embodiment, signing manager 220 is implemented using a hardware device including circuitry. The hardware device may be, for example, a digital signal processor, a field programmable gate array, or an application specific integrated circuit. The circuitry may be adapted to cause the hardware device to perform the functionality of signing manager 220. Signing manager 220 may be implemented using other types of hardware devices without departing embodiment disclosed herein.

In one embodiment, signing manager 220 is implemented using a processor adapted to execute computing code stored on a persistent storage that when executed by the processor performs the functionality of signing manager 220 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 230 is implemented using physical devices that provide data storage services (e.g., storing data and providing copies of previously stored data). The devices that provide data storage services may include hardware devices and/or logical devices. For example, storage 230 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 230 may include a memory device (e.g., a dual in line memory device) in which data is stored and from which copies of previously stored data are provided. In another example, storage 230 may include a persistent storage device (e.g., a solid-state disk drive) in which data is stored and from which copies of previously stored data is provided. In a still further example, storage 230 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 230 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 230 may store data structures including keys 232, received data structures 234, and/or signatures 236. As discussed above, keys 232 may include private and/or public keys associated with a user. Received data structures 234 may include any number of data structures obtained from other entities. Signatures 236 may include any number of signatures generated using keys 232 (e.g., a private key) and obtained data structures.

Keys 232, received data structures 234, and signatures 236 may be implemented using any type of data structure such as, for example, tables, lists, unstructured data, linked lists, databases, etc.

While various data structures have been illustrated and described in FIG. 2B with specific structures/locations/ content, any of the data structures may be stored in different locations, spanned across any number of devices, may be combined with other information, and/or divided into any number of data structures without departing from embodiments disclosed herein.

While security device 102 has been shown in FIGS. 2A-2B as included specific types and numbers of components, a security device in accordance with an embodiment may include different, fewer, and/or additional components.

In an embodiment, the number and type of components of security device 102 is reduced to only those necessary for security device 102 to provide its functionality, discussed above. Further, the hardware and/or software components of security device 102 may be verified as not being compromised. Additionally, security device 102 may generally be hardened such that security device 102 is incapable of performing other functions than those discussed herein and/or modification of its operation (e.g., absent physical attack through modification of its hardware components). By doing so, the security of security device 102 may be improved when compared to general purpose or configurable devices.

As discussed above, the components of FIG. 1 may perform various methods to manage generation and distribution of signatures. FIG. 3 illustrates examples of methods that may be performed by the components of FIG. 1 when providing their functionalities. In the diagrams discussed below and shown in FIG. 3, any of the operations may be repeated, performed in different orders, and/or performed in a parallel with other operations and/or a partially overlapping in time manner with other operations.

Turning to FIG. 3, a flow diagram illustrating a method of managing signature generation and distribution in accordance with an embodiment is shown. The method may be performed by a security device.

Prior to, during, and/or after the method illustrated in FIG. 3, a data processing system may obtain data structures for signing by a user. The data processing system may be insecure by virtue of its configurability and/or components for which their security status has not been resolved. To manage the signing process, a user may utilize a security device, as discussed above.

At operation 300, the security device is connected to a data processing system. The security device may be connected by forming an operable connection to the data processing system using an interface device. The operable connection may allow data structure to be transferred between the security device and the data processing system.

At operation 302, the security device is enrolled with the data processing system. The security device may be enrolled by providing the data processing system with a public key of a user for which the security devices maintains secrecy of a private key.

In an embodiment, the public key is wrapped in a cryptographically signed certificate. The certificate may be used to identify a manufacturer of the security device and/or provide a publicly verifiable way to attest to the authenticity of the security device against a well-known public key. Consequently, attestations by the manufacturer may be used to identify the security and key handling practices implemented by the security device.

At operation 304, a data structure is obtained from the data processing system. The data structure may be obtained via the operable connection.

At operation 306, information regarding the data structure is presented to a user of the security device for review. The information may be presented by displaying the information on a display of the security device. The interface elements of the security device may allow for the information to be scrolled through. The information may include, for example, portions of the data structure and/or reduced size representations of the data structure. Other types of information may be presented to the user via the display without departing from embodiments.

The information presented to the user may allow the user to investigate the data structure and make a decision with respect to whether to sign the data structure.

At operation 308, input from the user is obtained by the security device. The user input may be responsive to the presented information. For example, the input may indicate whether a data structure associated with information presented in operation 306 is to be signed.

In an embodiment, the information includes a passcode or other security data. The passcode may be required to be entered for the security device to sign the data structure.

In an embodiment, the information includes biometric information. The biometric may be compared to known biometric information (e.g., stored in the security device) for the user. The biometric information may need to match the known biometric information for the security device to sign the data structure.

Any type and quantity of information may be obtained via the user input.

At operation 310, a determination is made regarding whether the user input indicates signing approval for the data structure. The determination may be made based on the information obtained via the user input. For example, input of the security data and/or providing of the biometric data may indicate that signing approval for the data structure has been granted.

When signing approval for the data structure is granted, the method may proceed to operation 312. When signing approval for the data structure is not granted, the method may proceed to operation 316.

At operation 312, a signature is generated using the data structure and a private key. For example, the data structure and the private key of a key-pair may be ingested by a function that generates the signature. The data structure may be recovered from the signature using the public key of a key-pair. The signature may be cryptographically secure against recovery of the private key through analysis.

At operation 314, the signature is provided to the data processing system. The signature may be provided to the data processing system via the operable connection.

In an embodiment, the signature is provided to the data processing system by participating in a flush with the data processing system. For example, the data processing system may eject and then reconnect to the security device which may trigger an update in visibility of data structures stored on the emulated mass storage device and readable by the data processing system. The signature may be provided by, after the flush, a user of the data processing selecting the signature for copying to the data processing system. The copying may result in the signature being distributed to the data processing system.

The signature provided to the data processing system may be distributed by the data processing system to other devices (e.g., control planes and/or other systems).

The method may end following operation 314.

Returning to operation 310, the method may proceed to operation 316 following operation 310 when it is determined that signing approval for the data structure is not indicated by the user input.

At operation 316, a signature is not generated for the data structure. The signature may not be generated by, for example, discarding the data structure.

The method may end following operation 316.

Using the method illustrated in FIG. 3, signatures for data structures stored on insecure data processing systems may be obtained while reducing risk of dissemination of private keys used to obtain the signatures.

To further clarify embodiments disclosed herein, now consider an example scenario as illustrated in FIGS. 4A-4E in which a data processing system 100 obtains a data structure which may need to be signed for security purposes. However, data processing system 100 may be insecure. Prior to obtaining the data structure, security device 102 may operably connect to data processing system 100 and/or enroll with it.

Turning to FIGS. 4A-4E, diagrams illustrating actions that may be performed by components of a system similar to that of FIG. 1 in accordance with an embodiment is shown. In FIGS. 4A-4E, actions performed by various components are highlighted with numbered circles and interactions between components (e.g., data transmissions) are shown using lines terminating in arrows.

Figure 4A:
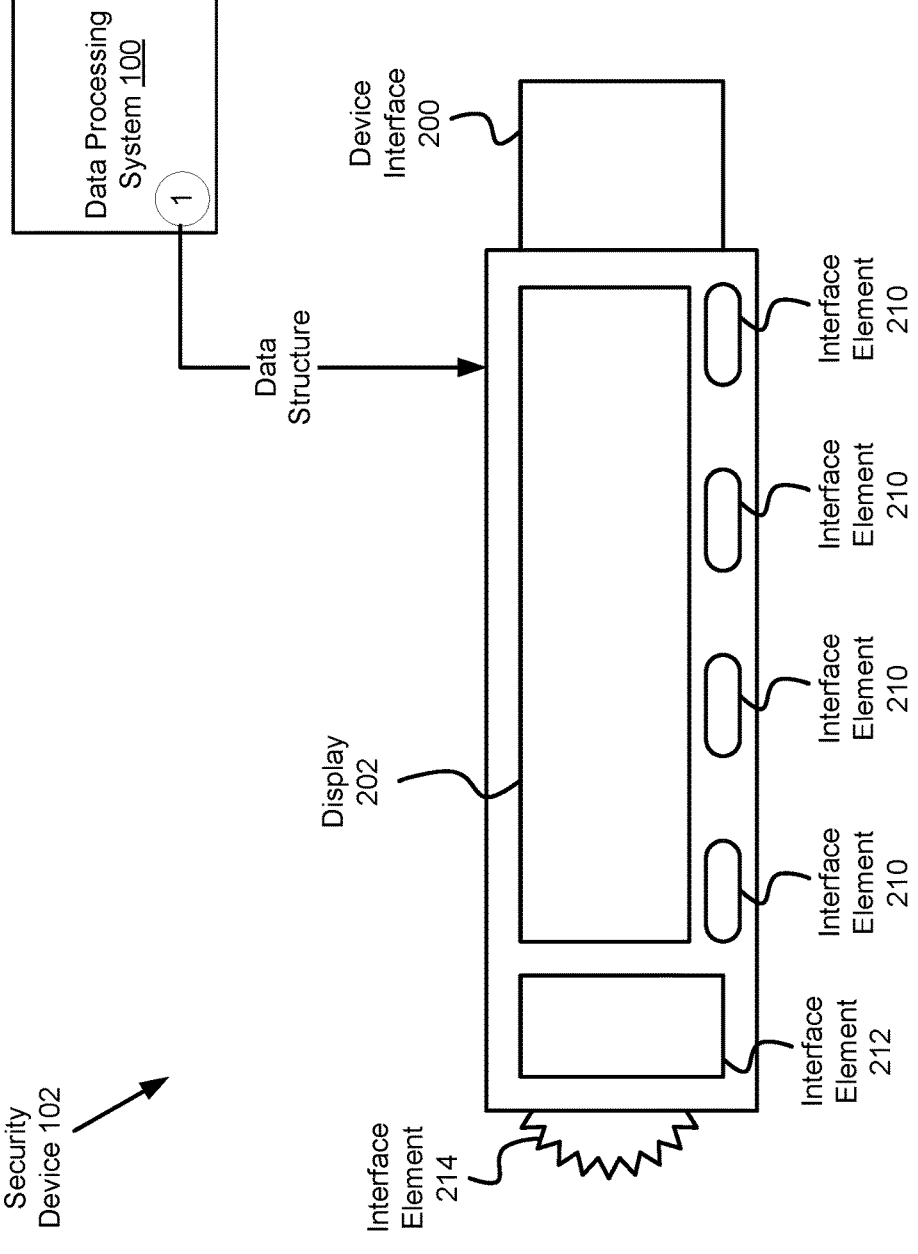
FIGS. 4A-4E show diagrams illustrating actions performed by and/or interactions between components of a system in accordance with an embodiment.

Turning to FIG. 4A, to facilitate signing of the data structure, data processing system 100 may, at block 1, store a copy of the data structure in security device 102. For example, from the perspective of data processing system 100, security device 102 may be a mass storage device.

Figure 4B:
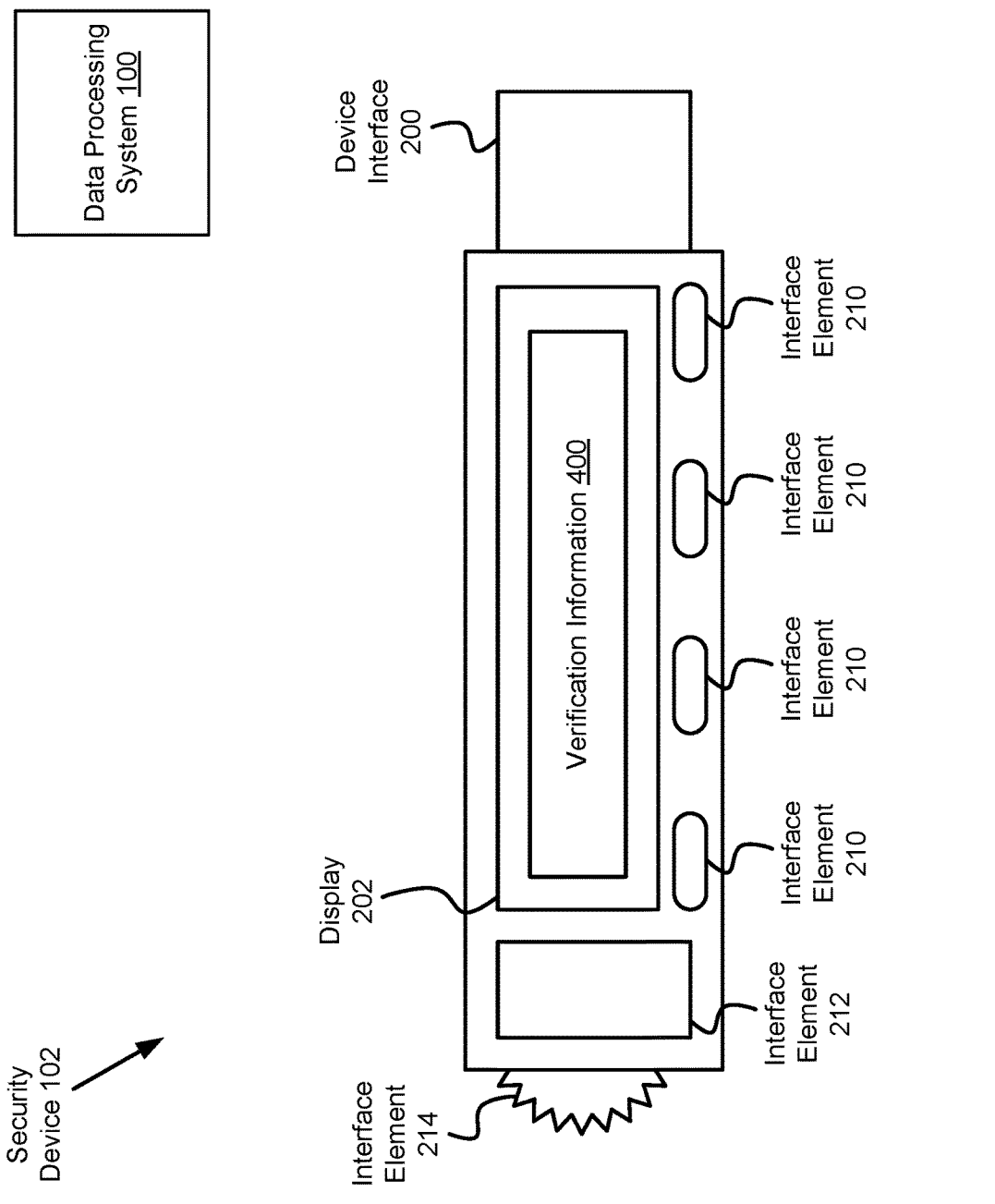

Turning to FIG. 4B, security device 102 may display verification information 400 on display 202. The user may review verification information 400. The verification information may include any type of information usable by the user to make an informed decision with respect to whether to sign the data structure. The user may use any of interface elements 210-214 to manage the process of revising verification information 400. For example, interface element 214 may be used to provide user feedback to security device 102 that causes various portions of the data structure to be displayed as verification information 400.

Figure 4C:
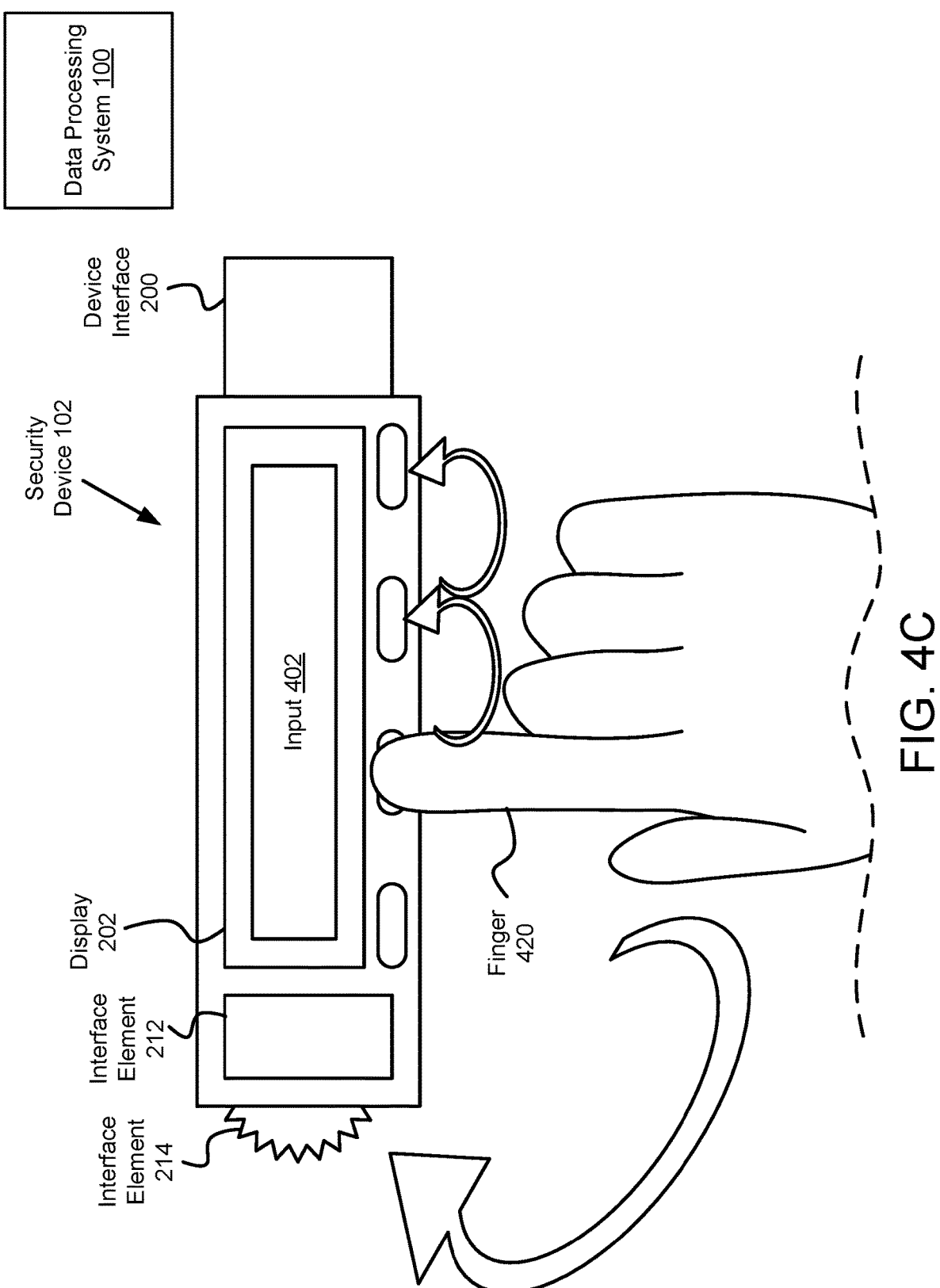

Turning to FIG. 4C, after reviewing verification information 400, the user may use a finger 420 to actuate various interface elements 210-214. Security device 102 may monitor the actuation of interface elements 210-214 to obtain user input. The user input may include an indication of whether signing of the data structure is authorized, or not authorized. The user input may also include security information such as a passcode required for signing authorization to be granted. The interface elements may be actuated in any order and in any manner. For example, in FIG. 4C, the oversized arrows indicate that various actuations of interface elements 214 and interface elements (e.g., 210) may be made to provide input to security device 102. The user input (e.g., 402) may be displayed, entirely, in part, and/or in an obfuscated manner so as to reduce the likelihood of the input being obtained by others in proximity to security device 102.

Figure 4D:
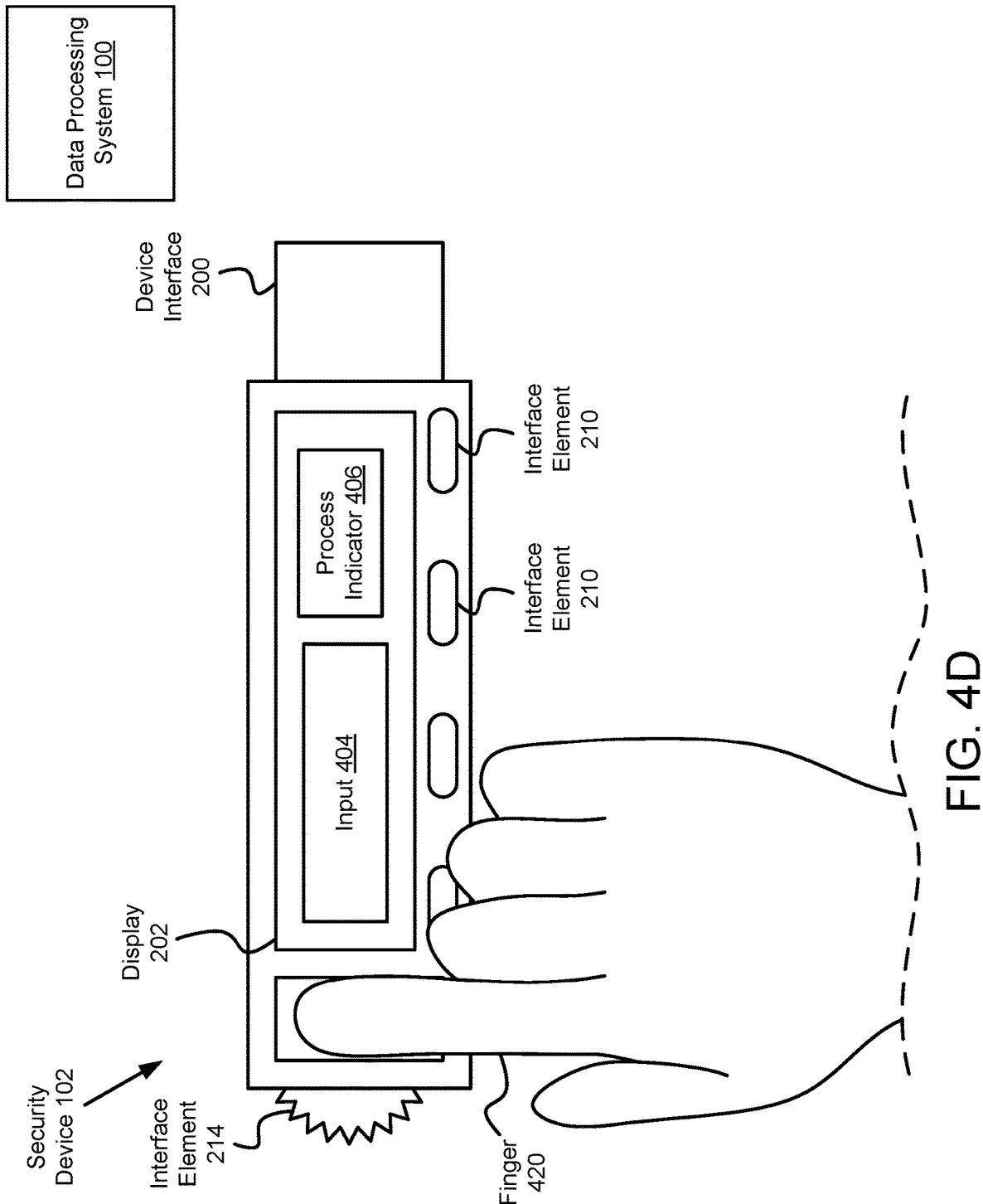

Turning to FIG. 4D, the user may use interface element 212 to provide biometric information to security device 102. For example, if interface element 212 is implemented with a fingerprint scanner, then the user may place finger 420 proximate to interface element 212 to provide the biometric information. While doing so, display 202 may provide information such as input 404 and process indicator 406 regarding the process of acquiring the biometric information. Process indicator 406 may be shown on display 202 and which may indicate whether the biometric information has been obtained by security device 102. Input 404 may indicate information regarding the collected biometric information (e.g., whether it matches that expected for the user). The biometric information may be required for signing authorization for the data structure to be granted.

In this example scenario, using the input from the user, security device 102 may deduce that the user wishes for a signature for the data structure to be generated and distributed. Consequently, the signature may be generated using the data structure and a private key stored in security device 102.

Figure 4E:
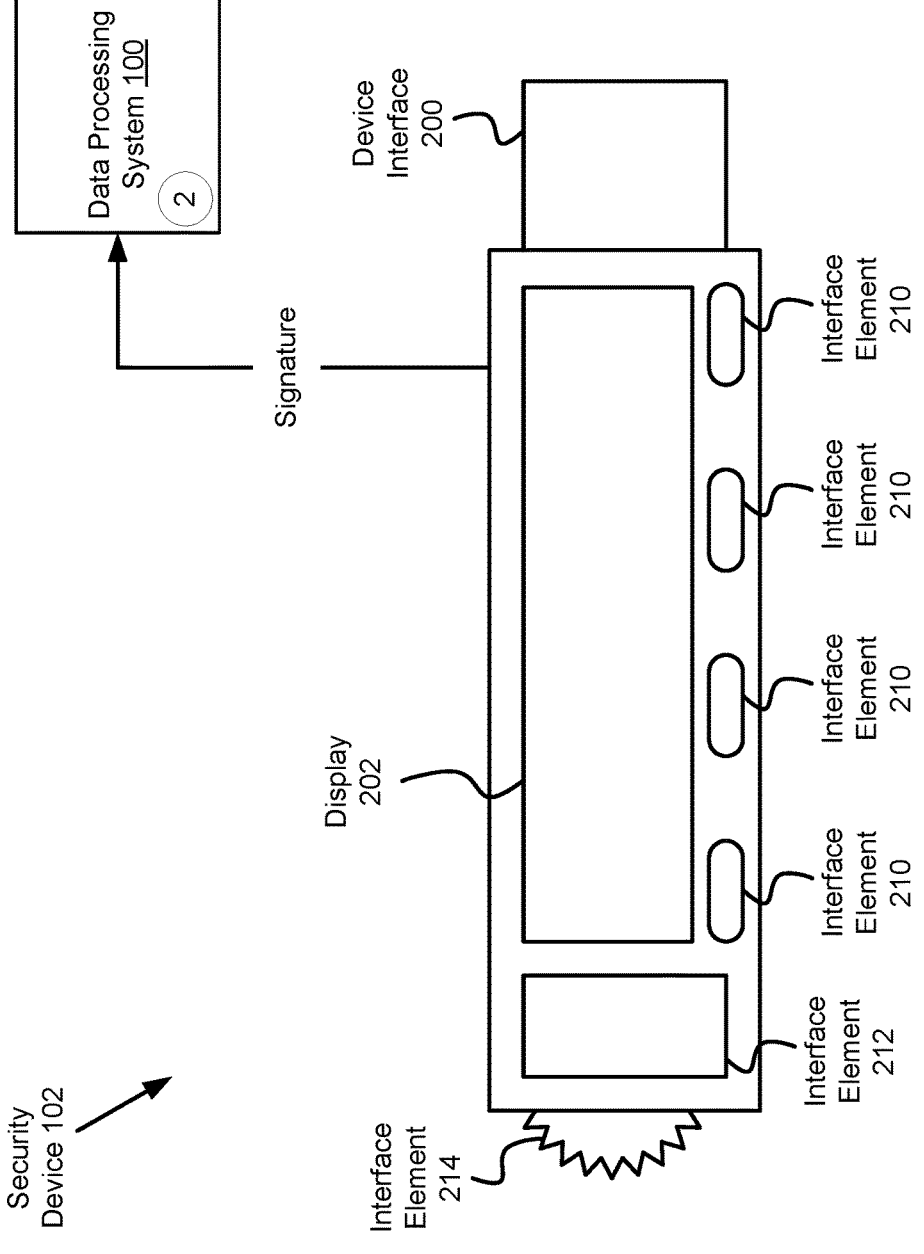

Turning to FIG. 4E, to distribute the signature, the signature may be provided to data processing system 100. When received, at operation 2, data processing system 100 may utilize the signature and/or forward the signature to other entities such as control planes that may use the signature for control purposes. For example, the control plane may use a copy of the user's public key to determine that the user signed the data structure, and may take action as specified in the data structure to the extent that the user has rights to implement actions indicated by the data structure.

Thus, as illustrated in these figures, embodiments disclosed herein may provide a system for managing signature generation and distribution that reduces the risk of unintended dissemination of private keys. By doing so, the security of a distributed system may be improved, and the burden on data processing system of the distributed system may be reduced by allowing for insecure data processing systems to be used for signature distribution.

Figure 5:
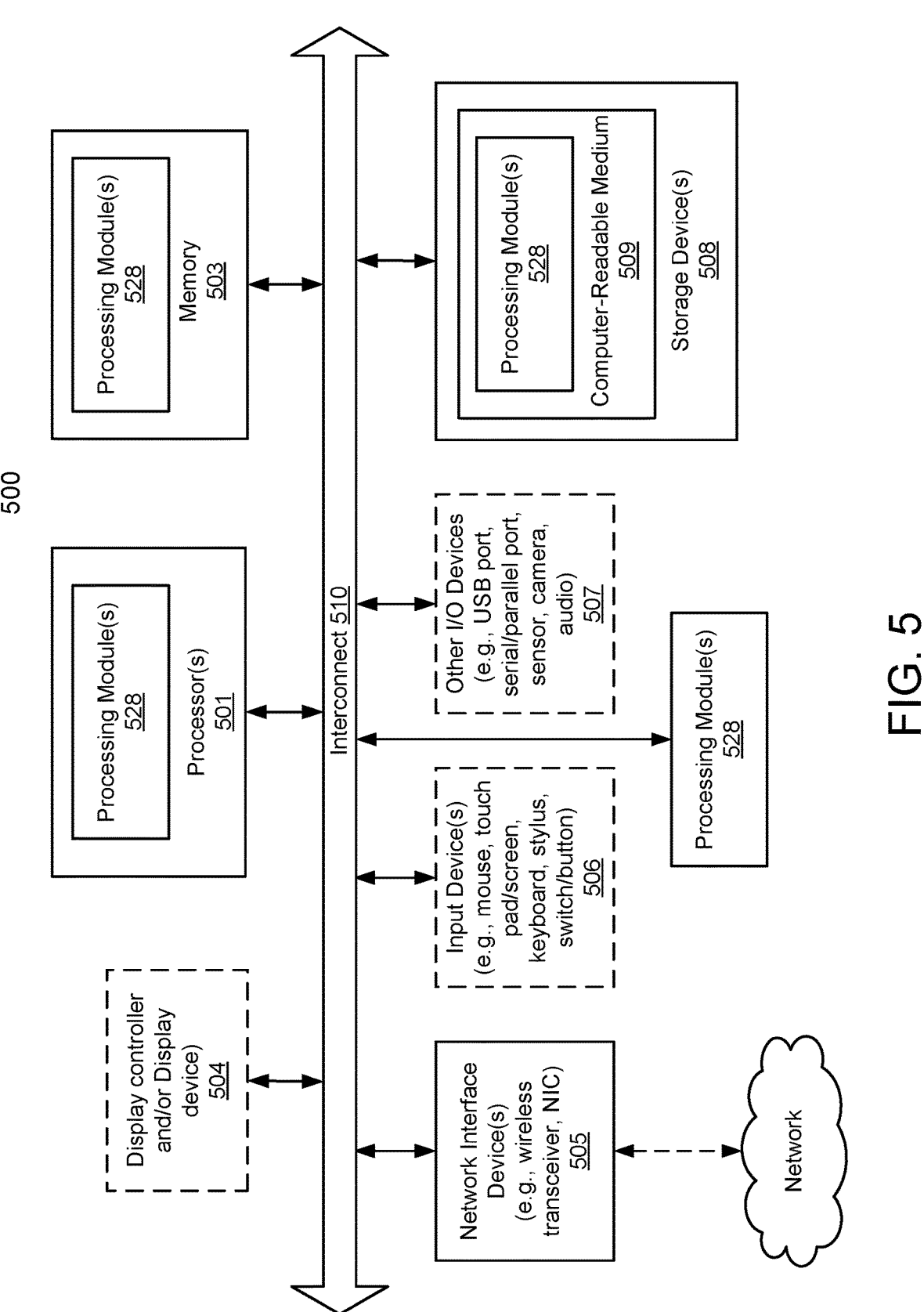
FIG. 5 shows a block diagram illustrating a data processing system in accordance with an embodiment.

Any of the components illustrated in FIGS. 1-4E may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft Mac OS®/iOS® from Apple, Android® from Google®, Linux®, Unix®, or other real-time or embedded operating systems such as VxWorks.

System 500 may further include 10 devices such as devices (e.g., 505, 506, 507, 508) including network interface device(s) 505, optional input device(s) 506, and other optional 10 device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/ logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing security in a distributed system comprising an insecure data processing system, the method comprising:

obtaining, by a security device and from the insecure data processing system, a data structure for signing, the security device being a stand-alone plug and play device that is physically detachable from the insecure data processing system, wherein:

the security device is presented to the insecure data processing system as a device having only a data storing functionality and a data reading functionality, the security device is configured to be hardened to ignore any first communications from the insecure data processing system that are not directed to the data storing functionality and the data reading functionality such that the insecure data processing system responds only to second communications from the insecure data processing system that are associated with requesting storage of data into and reading of data out from the security device while completely disregarding and not responding to any of the first communications, the first and second communications comprising requests and actions received from the insecure data processing system to modify the security device and/or cause the security device to perform one or more functionalities, and the security device is further configured without network connection capabilities and is only able to communicate and exchange data with a physical computing device to which the security device is physically plugged in to without being able to communicate with any other devices that are connected to the physical computing device via a network;

presenting information regarding the data structure to a user of the insecure data processing system via a built-in display of the security device;

obtaining user input from the user, the user input being responsive to the presented information, and the user input being obtained with one or more interface elements of the security device, the one or more interface elements being built-in buttons and sensors of the security device;

making a determination that the user input indicates signing approval from the user for the data structure;

based on the determination:

generating a signature using the data structure and a private key associated with the user; and providing the data structure and the signature to the insecure data processing system by changing, by the security device, a visibility setting of the signature in response to the insecure data processing system ejecting and then being physically reconnected to the security device, wherein the signature is kept hidden and unreadable to the insecure data processing system until after the insecure data processing system has ejected and then reconnected to the security device, and a performance by the security device of the changing of the visibility setting of the signature is independent of a content of the signature and only dependent on the data processing system ejecting and then being physically reconnected to the security device.

2. The computer-implemented method of claim 1, wherein obtaining the data structure comprises:

emulating, by the security device and after the security device is physically plugged into the insecure data processing system, a mass storage device to present the security device to the insecure data processing system as a different type of physical device; and receiving the data structure via a storage command from the insecure data processing system, the storage command being used by the insecure data processing system to interact with the security device as the mass storage device.

3. The computer-implemented method of claim 2, wherein providing the data structure and the signature to the insecure data processing system comprises:

presenting the signature to the insecure data processing system as another data structure stored on the security device emulating as the mass storage device;

receiving a read command for the signature from the insecure data processing system and directed toward the security device emulating as the mass storage device;

generating a read response based on the signature; and sending the read response to the insecure data processing system.

4. The computer-implemented method of claim 1, further comprising:

enrolling the security device with the insecure data processing system prior to obtaining the data structure.

5. The computer-implemented method of claim 1, wherein the private key is inaccessible to the insecure data processing system from the security device.

6. The computer-implemented method of claim 1, wherein presenting information regarding the data structure to the user of the insecure data processing system via the display of the security device comprises:

generating a reduced size representation of the data structure; and displaying a portion of the reduced size representation of the data structure on the display of the security device.

7. The computer-implemented method of claim 6, wherein the reduced size representation comprises a hash of the data structure.

8. The computer-implemented method of claim 7, wherein presenting information regarding the data structure to the user of the insecure data processing system via the display of the security device further comprises:

coordinating with a second insecure data processing system operably connected to the insecure data processing system to generate a copy of the reduced size representation of the data structure to facilitate comparison of the reduced size representation and the copy of the reduced size representation by the user.

9. The method of claim 1, wherein the stand-alone plug and play device making up the security device comprises a first processor that is separate and independent from a second processor of the insecure data processing system.

10. The method of claim 9, wherein presenting the information regarding the data structure to the user of the insecure data processing system via the built-in display of the security device comprises:

displaying a hash of the data structure on the built-in display, wherein while the hash of the data structure is displayed, the user receives another hash of the data structure generated by a trusted data processing system different from the insecure data processing system, the another hash being used by the user to authenticate the hash of the data structure displayed on the built-in display.

11. A security device, comprising:

a processor; and a memory coupled to the processor to store instructions, which when executed by the processor, cause the processor to perform operations for managing security in a distributed system comprising an insecure data processing system, the operations comprising:

obtaining, by the security device and from the insecure data processing system, a data structure for signing, the security device being a stand-alone plug and play device that is physically detachable from the insecure data processing system, wherein;

the security device is presented to the insecure data processing system as a device having only a data storing functionality and a data reading functionality, the security device is configured to be hardened to ignore any first communications from the insecure data processing system that are not directed to the data storing functionality and the data reading functionality such that the insecure data processing system responds only to second communications from the insecure data processing system that are associated with requesting storage of data into and reading of data out from the security device while completely disregarding and not responding to any of the first communications, the first and second communications comprising requests and actions received from the insecure data processing system to modify the security device and/or cause the security device to perform one or more functionalities, and the security device is further configured without network connection capabilities and is only able to communicate and exchange data with a physical computing device to which the security device is physically plugged in to without being able to communicate with any other devices that are connected to the physical computing device via a network;

presenting information regarding the data structure to a user of the insecure data processing system via a built-in display of the security device;

obtaining user input from the user, the user input being responsive to the presented information, and the user input being obtained with one or more interface elements of the security device, the one or more interface elements being built-in buttons and sensors of the security device;

making a determination that the user input indicates signing approval from the user for the data structure;

based on the determination:

generating a signature using the data structure and a private key associated with the user; and providing the data structure and the signature to the insecure data processing system by changing, by the security device, a visibility setting of the signature in response to the insecure data processing system ejecting and then being physically reconnected to the security device, wherein the signature is kept hidden and unreadable to the insecure data processing system until after the insecure data processing system has ejected and then reconnected to the security device, and a performance by the security device of the changing of the visibility setting of the signature is independent of a content of the signature and only dependent on the data processing system ejecting and then being physically reconnected to the security device.

12. The security device of claim 11, wherein obtaining the data structure comprises:

emulating, by the security device and after the security device is physically plugged into the insecure data processing system, a mass storage device to present the security device to the insecure data processing system as a different type of physical device; and receiving the data structure via a storage command from the insecure data processing system, the storage command being used by the insecure data processing system to interact with the security device as the mass storage device.

13. The security device of claim 12, wherein providing the data structure and the signature to the insecure data processing system comprises:

presenting the signature to the insecure data processing system as another data structure stored on the security device emulating as the mass storage device;

receiving a read command for the signature from the insecure data processing system and directed toward the security device emulating as the mass storage device;

generating a read response based on the signature; and sending the read response to the insecure data processing system.

14. The security device of claim 12, wherein presenting the signature to the insecure data processing system comprises participating in a flush of the security device that is emulating as the mass storage device by the insecure data processing system.

15. A non-transitory machine-readable medium having instructions stored therein, which when executed by a processor, cause the processor to perform operations for managing security in a distributed system comprising an insecure data processing system, the operations comprising:

obtaining, by a security device and from the insecure data processing system, a data structure for signing, the security device being a stand-alone plug and play device that is physically detachable from the insecure data processing system, wherein:

the security device is presented to the insecure data processing system as a device having only a data storing functionality and a data reading functionality, the security device is configured to be hardened to ignore any first communications from the insecure data processing system that are not directed to the data storing functionality and the data reading functionality such that the insecure data processing system responds only to second communications from the insecure data processing system that are associated with requesting storage of data into and reading of data out from the security device while completely disregarding and not responding to any of the first communications, the first and second communications comprising requests and actions received from the insecure data processing system to modify the security device and/or cause the security device to perform one or more functionalities, and the security device is further configured without network connection capabilities and is only able to communicate and exchange data with a physical computing device to which the security device is physically plugged in to without being able to communicate with any other devices that are connected to the physical computing device via a network;

presenting information regarding the data structure to a user of the insecure data processing system via a built-in display of the security device;

obtaining user input from the user, the user input being responsive to the presented information, and the user input being obtained with one or more interface elements of the security device, the one or more interface elements being built-in buttons and sensors of the security device;

making a determination that the user input indicates signing approval from the user for the data structure;

based on the determination:

generating a signature using the data structure and a private key associated with the user; and providing the data structure and the signature to the insecure data processing system by changing, by the security device, a visibility setting of the signature in response to the insecure data processing system ejecting and then being physically reconnected to the security device, wherein the signature is kept hidden and unreadable to the insecure data processing system until after the insecure data processing system has ejected and then reconnected to the security device, and a performance by the security device of the changing of the visibility setting of the signature is independent of a content of the signature and only dependent on the data processing system ejecting and then being physically reconnected to the security device.

16. The non-transitory machine-readable medium of claim 15, wherein obtaining the data structure comprises:

emulating, by the security device and after the security device is physically plugged into the insecure data processing system, a mass storage device to present the security device to the insecure data processing system as a different type of physical device; and receiving the data structure via a storage command from the insecure data processing system, the storage command being used by the insecure data processing system to interact with the security device as the mass storage device.

17. The non-transitory machine-readable medium of claim 16, wherein providing the data structure and the signature to the insecure data processing system comprises:

presenting the signature to the insecure data processing system as another data structure stored on the security device emulating as the mass storage device;

receiving a read command for the signature from the insecure data processing system and directed toward the security device emulating as the mass storage device;

generating a read response based on the signature; and sending the read response to the insecure data processing system.

18. The non-transitory machine-readable medium of claim 15, further comprising:

enrolling the security device with the insecure data processing system prior to obtaining the data structure.

19. The non-transitory machine-readable medium of claim 15, wherein the private key is inaccessible to the insecure data processing system from the security device.

20. The non-transitory machine-readable medium of claim 15, wherein presenting information regarding the data structure to the user of the insecure data processing system via the display of the security device comprises:

generating a reduced size representation of the data structure; and displaying a portion of the reduced size representation of the data structure on the display of the security device.

* * * * *